United States Patent [19]
Loeffler

[11] Patent Number: 5,893,892
[45] Date of Patent: *Apr. 13, 1999

[54] VIBRATION SENSING AND DIAGNOSTIC SYSTEM FOR VEHICLE DRIVE TRAIN COMPONENTS

[75] Inventor: John M. Loeffler, Toledo, Ohio

[73] Assignee: Dana Corporation, Toledo, Ohio

[*] Notice: This patent is subject to a terminal disclaimer.

[21] Appl. No.: 08/786,424

[22] Filed: Jan. 20, 1997

Related U.S. Application Data

[63] Continuation-in-part of application No. 08/636,726, Apr. 23, 1996, Pat. No. 5,596,496, which is a continuation of application No. 08/366,059, Dec. 29, 1994, abandoned.

[51] Int. Cl.$^6$ ............................................. B60K 17/34
[52] U.S. Cl. .................. 701/29; 701/69; 364/528.15; 180/248; 180/233
[58] Field of Search ................... 701/29, 31, 32, 701/33, 69; 475/221, 249, 295, 86, 85, 203; 180/69.6, 178, 248, 249, 233; 364/508, 528.15; 74/650, 665 T, 665 G; 192/103 F, 3.62; 73/593, 659, 660, 579, 658; 477/43, 46, 97

[56] References Cited

U.S. PATENT DOCUMENTS

| | | | |
|---|---|---|---|
| 3,677,072 | 7/1972 | Weichbrodt et al. | 73/593 |
| 4,010,637 | 3/1977 | Harwell et al. | 73/658 |
| 4,078,434 | 3/1978 | Weberhofer | 73/593 |
| 4,086,820 | 5/1978 | Kraus et al. | 476/2 |
| 4,252,023 | 2/1981 | Pomernacki | 73/593 |
| 4,275,612 | 6/1981 | Silvester | 74/473.19 |
| 4,466,311 | 8/1984 | Hiramatsu | 477/169 |
| 4,559,828 | 12/1985 | Liszka | 73/658 |
| 4,716,790 | 1/1988 | Sawada et al. | 701/65 |
| 4,727,954 | 3/1988 | Matsumoto | 180/249 |
| 4,744,437 | 5/1988 | Matsumoto | 180/249 |
| 4,787,269 | 11/1988 | Matsumoto | 180/247 |
| 4,790,191 | 12/1988 | Shultz, Jr. | 73/661 |
| 4,819,506 | 4/1989 | Matsumoto | 180/248 |
| 4,872,337 | 10/1989 | Watts et al. | 73/162 |
| 4,898,567 | 2/1990 | Tatara et al. | 474/174 |
| 4,903,811 | 2/1990 | Kobayashi et al. | 180/233 |
| 4,995,862 | 2/1991 | Arocha | 180/233 |
| 5,064,036 | 11/1991 | Schneider | 192/103 F |
| 5,066,268 | 11/1991 | Kobayashi | 180/249 |
| 5,166,879 | 11/1992 | Greene et al. | 701/62 |
| 5,215,161 | 6/1993 | Kobayashi | 180/248 |
| 5,246,408 | 9/1993 | Kobayashi | 475/221 |
| 5,267,907 | 12/1993 | Hedeen | 474/69 |
| 5,277,287 | 1/1994 | Ishii et al. | 192/3.31 |
| 5,305,216 | 4/1994 | Okura et al. | 701/35 |
| 5,386,372 | 1/1995 | Kobayashi et al. | 364/528.15 |
| 5,596,496 | 1/1997 | Loeffler | 701/29 |
| 5,627,438 | 5/1997 | Barrett | 180/178 |
| 5,683,322 | 11/1997 | Meyerle | 475/72 |
| 5,701,062 | 12/1997 | Barrett | 180/69.6 |

*Primary Examiner*—Jacques H. Louis-Jacques
*Attorney, Agent, or Firm*—MacMillan, Sobanski & Todd, LLC

[57] ABSTRACT

A drive train assembly and monitoring system for indicating the operating condition of the drive train assembly includes a drive train assembly having a power distribution device for distributing rotative power within the drive train. A sensor is attached to a portion of the drive train assembly, the sensor being responsive to the vibration of the portion or component of the drive train assembly for generating signals indicative of the sensed vibration. A controller receives the signals from the sensor and generates an indication of the operating condition of the drive train assembly based on the vibration of the portion of the drive train assembly. Preferably the sensor is adapted to detect both the frequency and magnitude of vibration of the drive train assembly and to generate signals indicative of the sensed frequency and magnitude of vibration.

20 Claims, 5 Drawing Sheets

VIBRATION SENSING AND DIAGNOSTIC SYSTEM FOR VEHICLE DRIVE TRAIN COMPONENTS

CROSS REFERENCE TO RELATED APPLICATIONS

This application is a Continuation-In-Part of copending U.S. patent application Ser. No. 08/636,726, filed Apr. 23, 1996, now U.S. Pat. No. 5,596,496, which is a Continuation of U.S. patent application Ser. No. 08/366,059, filed Dec. 29, 1994, now abandoned.

BACKGROUND OF THE INVENTION

This invention relates in general to vehicle drive train components and in particular to sensing vibration or other operating conditions of various parts of vehicle transmissions and other drive train components.

In most vehicles, a transmission is provided in the drive train between the engine and the driven wheels. As is well known, the transmission includes a plurality of gears which are selectively engaged to provide a plurality of speed reduction gear ratios between the input and the output of the transmission. A plurality of control members, such as clutch collars, contained within the transmission are moved by a driver of the vehicle throughout a plurality of gear ratio positions for selecting the desired speed reduction. As a result, acceleration and deceleration of the vehicle can be achieved in a smooth and efficient manner.

Typical transmission structure includes an input shaft, a countershaft, and a mainshaft. Gears positioned between the input shaft and the countershaft drive the countershaft at a rotation speed proportional to the engine speed. Countershaft gears of different sizes are rigidly mounted on the countershaft for rotation, and these also rotate at speeds proportional to the engine speed. For example, the gears mounted on the countershaft could be forward gears one though five, plus reverse. The countershaft and the countershaft gears will always rotate at the same speed relative to each other since they are all mechanically linked together.

The countershaft gears drive another set of gears, the mainshaft gears, which are complementary to the countershaft gears. The mainshaft gears are mounted coaxially with the mainshaft, but not directly linked to the mainshaft. Since each of the mainshaft gears is rotated by meshing with the teeth of a different sized countershaft gear, each mainshaft gear is rotating at a speed different from every other mainshaft gear, but at a speed proportional to the engine speed. It is the clutch collars which cause the linkage between the rotating mainshaft gears and the mainshaft. Axial movement of one of the clutch collars causes the splines of the clutch collar to link the associated mainshaft gear with the mainshaft, thereby causing a mechanical link all the way from the input shaft to the mainshaft. The mainshaft then rotates at a speed which is proportional to engine speed.

The transmission assembly so far described can be referred to as the main section, and there is frequently provided, downstream or rearwardly of the main section, an auxiliary transmission section which includes two or more speed reduction gear ratios, thereby compounding the gear ratio options of the entire transmission assembly. The eventual output from the transmission assembly is through the output shaft, which is typically connected via a universal joint to the drive shaft.

The rotating parts in the transmission assembly, including the input shaft, countershaft, mainshaft and output shaft are all mounted for rotation on bearings. Lubrication is required for the bearings as well as for the gears themselves with their intermeshing teeth. Typically, the transmission is contained within a transmission case or housing, which facilitates containment of the lubricants. Although the countershaft and mainshaft gears are always rotating, the load or torque on the gears and on the bearings will vary with the gear selected. For example, the load on the rear countershaft bearing will be higher for a lower gear than for a higher gear.

One of the problems with vehicle transmissions is that various parts are subject to wear and eventual failure. A prime example of transmission parts that are subject to failure is any one of the numerous sets of bearings associated with the many rotating parts of a transmission. Often there are subtle changes in the vibration patterns of a vehicle transmission part as it wears out or begins to fail. Therefore it would be helpful to be able to detect changes in vibration patterns.

The changes in vibration patterns are not always perceptible to the vehicle operator prior to the actual failure of the part. It would be advantageous if the vehicle driver were alerted to these subtle changes in vibration and the associated likelihood of failure of a part of the vehicle transmission. Also, even when the vehicle driver perceives a change in the vibration pattern, it is not always possible to determine the exact source of the vibration, or even the general area or zone of the transmission causing the vibration. Therefore it would be advantageous to have a diagnostic tool which would enable the source of vibration to be pinpointed or at least localized to a specific zone or area of the transmission. Any solution to the problem of detecting or diagnosing vibration should be relatively inexpensive, simple to operate and generally maintenance free. Ideally, any transmission vibration monitoring system would make use of existing diagnostic or control equipment and data sources already on board the vehicle.

SUMMARY OF THE INVENTION

The solution to the problem of detecting potential or imminent failure of various parts in a vehicle transmission is provided by the invention which includes placing a sensor on the transmission assembly to detect the mechanical vibration of the transmission assembly and to generate signals indicative of the sensed vibration. The sensed vibration can be compared to a previously established level of vibration. An output signal indicative of the sensed vibration can be sent to the vehicle operator. In a more sophisticated embodiment of the invention, an on-board computer or controller will use input, such as engine speed or ground speed, from other sources to assist in diagnosing the zone or region of the transmission assembly which is the likely source of vibration. Further, the computer or controller can be adapted to store in memory a history of vibration data for various gear ratio selections and various loading situations to help pinpoint the region or zone which has the failing transmission part.

According to this invention, there is provided a combined transmission assembly and monitoring system for indicating the operating condition of the transmission assembly including a transmission assembly having an input shaft, an output shaft, and a plurality of components for connecting the output shaft for rotation at a predetermined speed relative to the input shaft, a sensor attached to a portion of the transmission assembly, the sensor being responsive to vibration of the portion of the transmission assembly for generating signals indicative of the sensed vibration, and a controller for receiving the signals from the sensor and generating an indication of the operating condition of the transmission assembly based on the vibration of the portion of the transmission assembly. A convenient location for the sensor is on the shift tower assembly, which is typically attached to the transmission case or housing.

The controller may be set up to operate periodically to compare the received signals from the sensors to predetermined values assigned to the transmission assembly. The controller may be set up to generate an output signal only when the aggregate values of the received signals over a specified period of time exceed a predetermined limit. The controller may be configured to first operate in a startup mode to use the received signals to establish the predetermined values, and then operate in a comparative mode in which the received signals are compared to the predetermined values.

The controller can be adapted to make various assessments in response to the sensed vibration in order to pinpoint or at least localize the source of vibration. For example, the controller can be adapted to assess whether or not the sensed frequency of vibration is proportional to the vehicle ground speed regardless of which gear is engaged. The controller can be configured to assess whether or not the sensed frequency of vibration is proportional to the engine speed regardless of which gear is engaged. The controller can be adapted to assess whether or not the sensed frequency of vibration changes upon the engagement of different gears. In another variation, the controller is adapted to assess whether or not the sensed amplitude of vibration changes upon the engagement of different gears.

Where the vehicle transmission monitoring system is adapted with a main section having a plurality of gear ratios and an auxiliary section having at least two gear ratios, the controller can be adapted to assess whether or not the sensed frequency of vibration of the transmission assembly changes upon changing from one auxiliary gear to another.

According to this invention, there is also provided a method for indicating the operating condition of a transmission assembly having an input shaft, an output shaft, and a plurality of components for connecting the output shaft for rotation at a predetermined speed relative to the input shaft, where the method includes the steps of detecting the vibration of a transmission assembly with a sensor attached to a portion of the transmission assembly, generating signals indicative of the sensed vibration, receiving the signals from the sensor with a controller, and generating an indication of the operating condition of the transmission assembly based on the vibration.

The monitoring system of the invention can be used with other drive train assembly components besides the transmission. The invention includes monitoring the vibration of other drive train power distribution devices, such as for example, transaxles, differential housings, transfer cases, driveshaft center bearings, speed retarders, and power take-offs.

DETAILED DESCRIPTION OF THE INVENTION

Figure 1:
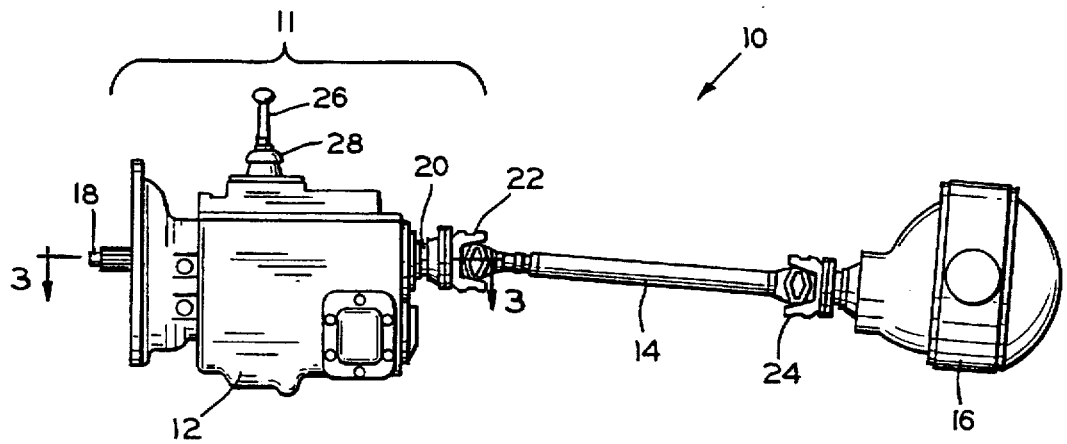
FIG. 1 is a side elevational view schematically illustrating a portion of a conventional vehicular drive train system including the vehicle transmission monitoring system of the invention.

Referring now to the drawings, there is illustrated in FIG. 1 a schematic view of a portion of a vehicular drive train system, indicated generally at 10, including the vehicle transmission monitoring system. A major portion of the drive train system 10 is the transmission assembly 11, which includes vehicle transmission 12. The transmission is connected through drive shaft 14 to axle assembly 16. The transmission 12 is generally conventional in the art and is intended to be representative of any known vehicle transmission structure, either manually or automatically shifted. The transmission 12 also includes input shaft 18 connected to the vehicle engine, not shown, and output shaft 20. Universal joints 22 and 24 connect the drive shaft 14 to the output shaft 20 and the axle assembly 16, respectively. The transmission is manually operable using gearshift lever 26 mounted through shift tower assembly 28. The term "transmission assembly" refers to any element of the transmission 12 as well as any associated part in the drive train, such as, for example, the input shaft 18, the output shaft 20 the universal joint yoke 22 and the shift tower assembly 28.

Figure 2:
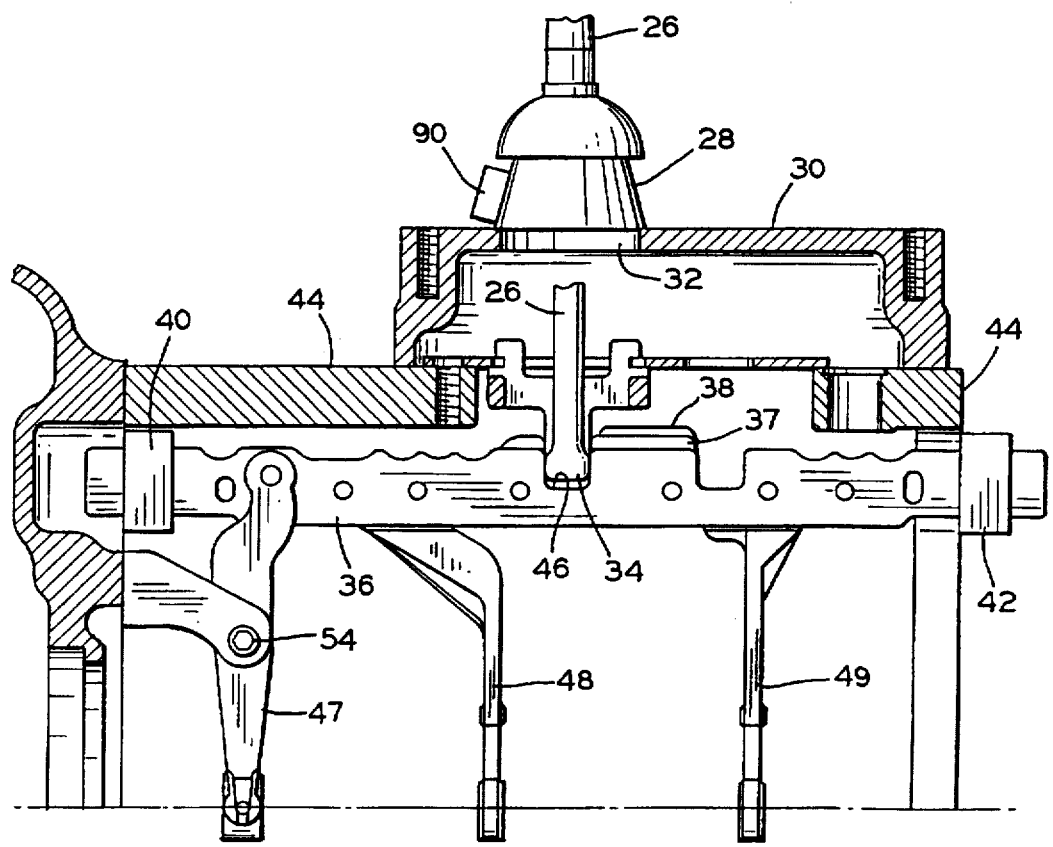
FIG. 2 is fragmentary side elevational view, partially in cross section, of the top portion of the transmission assembly shown in FIG. 1.

As shown in FIG. 2, the shift tower assembly 28 is mounted on gearshift housing 30. The shift tower assembly 28 supports the gearshift lever 26 and provides a mounting point for pivoting movement of the gearshift lever 26. The shift tower assembly 28 is mounted either directly or indirectly to the transmission, and it would be expected that vibration of the transmission 12 would be transmitted to the shift tower assembly. The upper end of the gearshift lever 26 extends into the cab of the vehicle where it can be moved by the driver of the vehicle. The central portion of the gearshift lever 26 is cut away and not shown in FIG. 2, but it extends through opening 32 in the gearshift housing 30.

The lower end 34 of the gearshift lever 26 extends down into engagement with a plurality of shift rails 36, 37 and 38. Shift rails 37 and 38 are positioned behind and in parallel with shift rail 36. Shift rails 36, 37 and 38 are slidably mounted within front and rear rail support members 40 and 42 in the conventional manner for axial movement. The front and rear support members 40 and 42 are secured to the transmission case 44 and have respective openings for slidably receiving the ends of the shift rails. Each of the shift rails is axially moveable from a central neutral position to either a forward position (to the left when viewing FIG. 2) to engage a first gear ratio, or to a rearward position (to the right when viewing FIG. 2) to engage a second gear ratio.

Forward notches, such as notch 46 in shift rail 36, and similar notches in the other shift rails 37 and 38, are aligned in a direction transverse to the axes of the shift rails when they are all in their neutral positions. It can be seen that the lower end 34 of the gearshift lever 26 extends down into engagement with the notches, such as notch 46 in the first shift rail 36.

Figure 3:
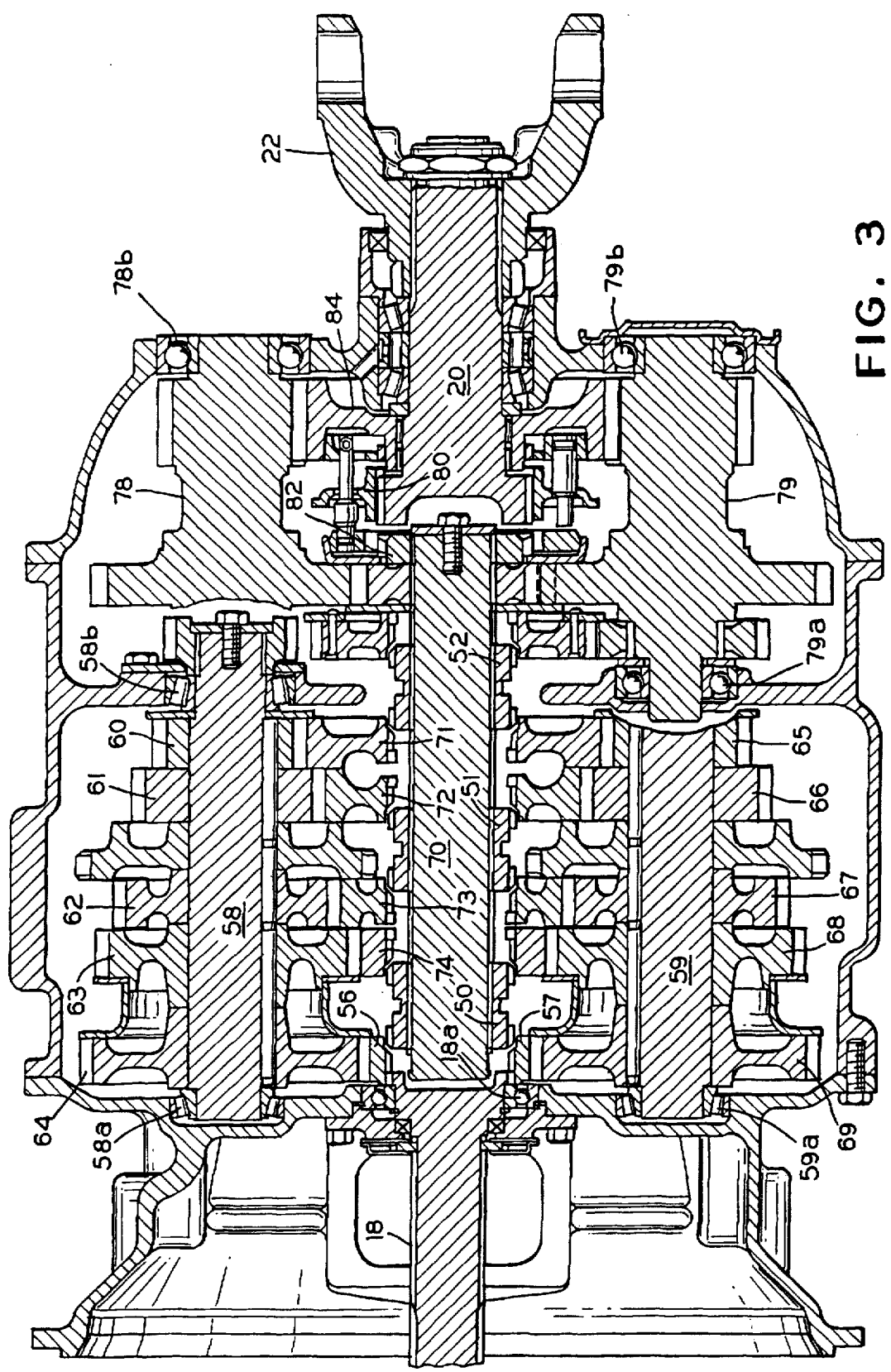
FIG. 3 is a schematic cross-sectional plan view of the transmission assembly, taken along line 3—3 of FIG. 1.

The three shift rails 36, 37 and 38 are respectively connected to forks 47, 48 and 49 which extend downwardly from their associated shift rails into engagement with respective gear engaging mechanisms, shown in FIG. 3 as clutch collars 50, 51 and 52. Shift fork 47 is mounted for pivotal movement on pin 54 so that axial movement of the shift rail 36 moves the lower end of fork 47 in the opposite direction, with the lower end of the fork being in engagement with the clutch collar 50. The operation of the gearshift lever 26, the shift rails 36, 37 and 38 and the shift forks 47, 48 and 49 to move the clutch collars 50, 51 and 52 to engage various gears in the transmission assembly 12 is well known in the art.

As shown in FIG. 3, the input shaft 18, which receives power from the engine, not shown, transmits rotative force via input gears 56 and 57 to first and second countershafts 58 and 59, respectively. Although two countershafts 58 and 59 are shown, it is to be understood that the transmission may be designed with only one countershaft or with more than two countershafts. The input shaft 18 is rotatably supported by bearings 18a. First countershaft 58 is supported by front bearings 58a and rear bearings 58b. Likewise, second countershaft 59 is supported by front bearings 59a, and rear bearings, not shown. A plurality of first countershaft gears 60–64 is attached onto first countershaft 58 for rotation, and a plurality second countershaft gears 65–69 is attached onto second countershaft 59 for rotation. Since all the gears 60 through 69 are attached to the associated first and second countershafts 58 and 59, they rotate at the same speed as the countershafts 58 and 59, which is a speed proportional to the engine speed.

A splined mainshaft 70 is also provided within the transmission case 44. A plurality of annular mainshaft gears 71, 72, 73, and 74 is disposed co-axially about the mainshaft 70. The first mainshaft gear 71 meshes with both first countershaft gear 60 and second countershaft gear 65. Similarly, the remaining mainshaft gears 72, 73, 74 mesh with the corresponding first countershaft gears 61, 62 and 63, and the corresponding second countershaft gears 66, 67 and 68. The mainshaft, countershaft, and associated mainshaft and countershaft gears are some of the components for connecting the output shaft for rotation at a predetermined speed relative to the input shaft, in a manner well known in the art.

Each of the clutch collars 50, 51 and 52 is illustrated in a neutral or non-gear engaging position, but is axially movable relative to the mainshaft 70 between two different gear engaging positions. For example, clutch collar 50 may be moved axially forwardly (toward the left when viewing FIG. 3) so as to connect the input drive gear 56 to the mainshaft 70 for direct drive operation. Clutch collar 50 may alternatively be moved axially rearwardly (toward the right when viewing FIG. 3) so as to connect mainshaft gear 74 to the mainshaft 70 for gear reduction operation. The other clutch collars 51 and 52 may be moved in a similar way to control the operation of the transmission 12 in a known manner. Although the axial movement of the clutch collars 50, 51 and 52 is shown as being accomplished by respective shift forks 47, 48 and 49, it will be appreciated that the selecting and shifting actions may alternatively be performed by any known automatic or automated manual apparatus.

The illustrated transmission 12 is a compound transmission. The components of the transmission thus far described constitute the main section of the transmission, which provides a predetermined number of speed reduction gear ratios. The illustrated transmission 12 further includes a conventional auxiliary section, which is located rearwardly (toward the right when viewing FIG. 3) of the main section. The auxiliary section also provides a predetermined number of speed reduction gear ratios in a known manner. The total number of speed reduction gear ratios available from the transmission 12 as a whole, therefore, is equal to the product of the gear ratios available from the main section and the gear ratios available from the auxiliary section.

The auxiliary section or range includes auxiliary countershafts 78 and 79 which are rotatably mounted in bearings, a forward bearing, not shown, and rear bearing 78b for the first countershaft 78, and forward and rear bearings 79a and 79b for the second countershaft 79. Auxiliary clutch collar 80 can be moved forwardly or rearwardly to engage the transmission output shaft 20 with either of the two gears 82 and 84. The universal joint yoke 22 is connected to the output shaft 20, and provides the rotational torque to drive shaft 14, as shown in FIG. 1. Although the illustrated transmission 12 is a compound transmission with a main section and an auxiliary section, it will be appreciated that any conventional single stage transmission may be used with the vehicle transmission monitoring system of the invention. The structure of the transmission thus far described is conventional in the art.

As shown in FIG. 2, sensor 90 is rigidly mounted on the shift tower assembly 28. The sensor can be any type of sensor suitable for sensing the vibration of the structure to which it is mounted. The sensor 90 can be a motion sensor, such as an accelerometer, and is adapted to generate a signal indicative of either the frequency or the amplitude, or both, of the vibration of the shift tower assembly 28 to which the sensor 90 is mounted. Since the shift tower assembly 28 is mounted either directly or indirectly on the transmission case 44, the sensor 90 will detect vibration of any element or portion of the transmission assembly 11. It is to be understood that the sensor 90 can be mounted on the transmission case 44 itself, or any other part of the transmission assembly 11.

Figure 4:
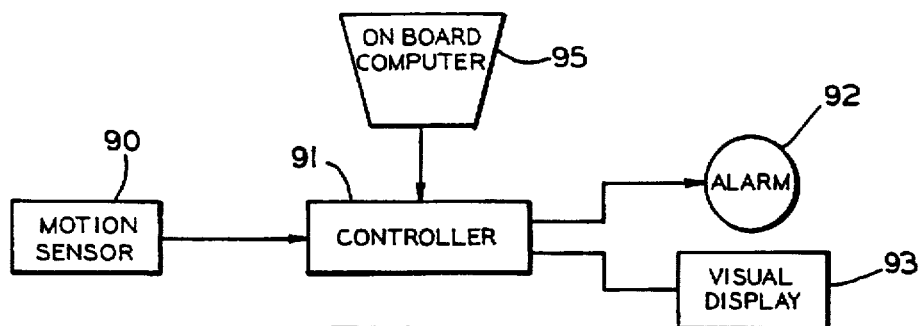
FIG. 4 is a schematic diagram illustrating the connections between the controller and other parts of the vehicle transmission monitoring system of the invention.

As shown schematically in FIG. 4, the sensor 90 is linked to a controller 91, which can be any microprocessor, computer or other device suitable for receiving data, storing data, making comparisons between received data and stored data, and generating output signals responsive to the comparisons. The controller 91 can be positioned at any suitable location on the vehicle. The signal indicative of the sensed vibration can be stored, or it can be sent to the vehicle operator. Also, the controller 91 can be programmed to sound an alarm 92 if the level of vibration sensed by the sensor 90 exceeds a predetermined level. Alternatively, the controller 92 can send a signal to a visual display 93 to generate a visual indication of the operating condition of the transmission 12, in the form of a numerical code, for example.

Data concerning some historical average levels of vibration can be stored in the controller, and the sensed vibration can be compared to the historical average of vibration. Also, the controller can be adapted to sound an alarm if the sensed vibration level exceeds the predetermined level a specified number of times in a predetermined time period. For example, the controller can be adapted to sound an alarm when the predetermined level is exceeded continuously for longer than ten seconds. The controller can be programmed to sound an alarm if the sensed vibration exceeds the predetermined level a specified number of times in a predetermined time period. For example, the controller can be programmed to sound an alarm when the sensed level of vibration exceeds the predetermined level ten times in an hour.

In another embodiment of the invention, an on-board controller 95 will supply signals (such as engine speed or ground speed) from other sources to the controller 91 to assist in diagnosing the zone or region of the transmission 12 likely to be the source of vibration. On-board controllers 95 are typically used to control engine operation, and these on-board controllers 95 are supplied with or generate data, which in turn could be supplied to the controller 91 to enhance the comparison process. For example, the on-board controller may generate data indicating engine speed and data indicating which of the several transmission gears is engaged at any given time. The controller can be adapted to take the engine speed and gear ratio data to pinpoint or localize possible failures in transmission parts. The gear ratio information could be used by the controller 91 to assess whether or not excessive vibration is occurring only when a certain gear is engaged, or whether the excessive vibration occurs during the engagement of several gears.

The controller 91 can be adapted to store in memory a history of vibration data for various gear ratio selections and various loading situations to help pinpoint the region or zone containing the failing transmission part. For example, the controller 91 can be adapted to assess whether or not the sensed frequency of the excessive vibration is proportional to the vehicle ground speed regardless of which gear is engaged. In such a case the source of vibration would not be associated with the input shaft, the countershafts, or the main gears, but would be limited to the mainshaft or some portion of the transmission rearward or downstream from the mainshaft.

The controller 91 can be adapted to make various assessments in response to the sensed vibration in order to pinpoint or at least localize the source of vibration. The controller can be adapted to assess whether or not the sensed frequency of vibration changes upon the engagement of different gears. In another variation, the controller is adapted to assess whether or not the sensed amplitude of vibration changes upon the engagement of different gears. If the vibration decreases from the lower gears (e.g. mainshaft gears 71 and 72) to the higher gears (e.g. mainshaft gears 73 and 74) then the cause of the vibration might be at the rearward end of the countershafts 58 and 59, and might be caused by the rearward bearings 58b or 59b. In this situation the load on the bearings would shift from a high load on the rearward bearings 58b and 59b in the lowest gears, to a high load on the forward countershaft bearings 58a and 59a in the high gears.

Where the vehicle transmission assembly is adapted with a main section having a plurality of gear ratios and an auxiliary or range section having at least two gear ratios, the controller 91 can be adapted to assess whether or not the sensed frequency of vibration of the transmission assembly changes upon changing from one of the auxiliary gears 82 or 84 to the other. For example, if the excessive vibration occurs only in the high range or only in the low range, then the source of the problem is probably in the auxiliary section. If the vibration does not vary with changes in the range, then the problem may be associated with the mainshaft 70, such as excessive wear or failure of the mainshaft bearings, or with other parts of the transmission 12.

The controller 91 may be set up to operate periodically rather than continuously to compare the received signals from the sensor 90 to predetermined values assigned to the transmission assembly 11. The controller may be set up to generate the output signal only when the aggregate values of the received signals exceed a predetermined limit. The controller may be configured to first operate in a startup mode to use the received signals to establish predetermined values of vibration, and then operate in a comparative mode in which the received signals are compared to the predetermined values.

In a specific embodiment of the invention, the sensor 90 is operatively connected to a portion of the transmission assembly 11 to detect the frequency and magnitude of mechanical vibration of just that portion of the transmission assembly 11 and to generate signals indicative of the sensed frequency and magnitude of vibration of that portion of the transmission assembly 11. The controller 91 is adapted to receive the signals from the sensor 90 and compare them to predetermined values assigned to the portion of the transmission assembly 11. For example, the sensor 90 could be positioned on the housing for the rearward auxiliary countershaft bearings 78b and 79b.

Figure 5:
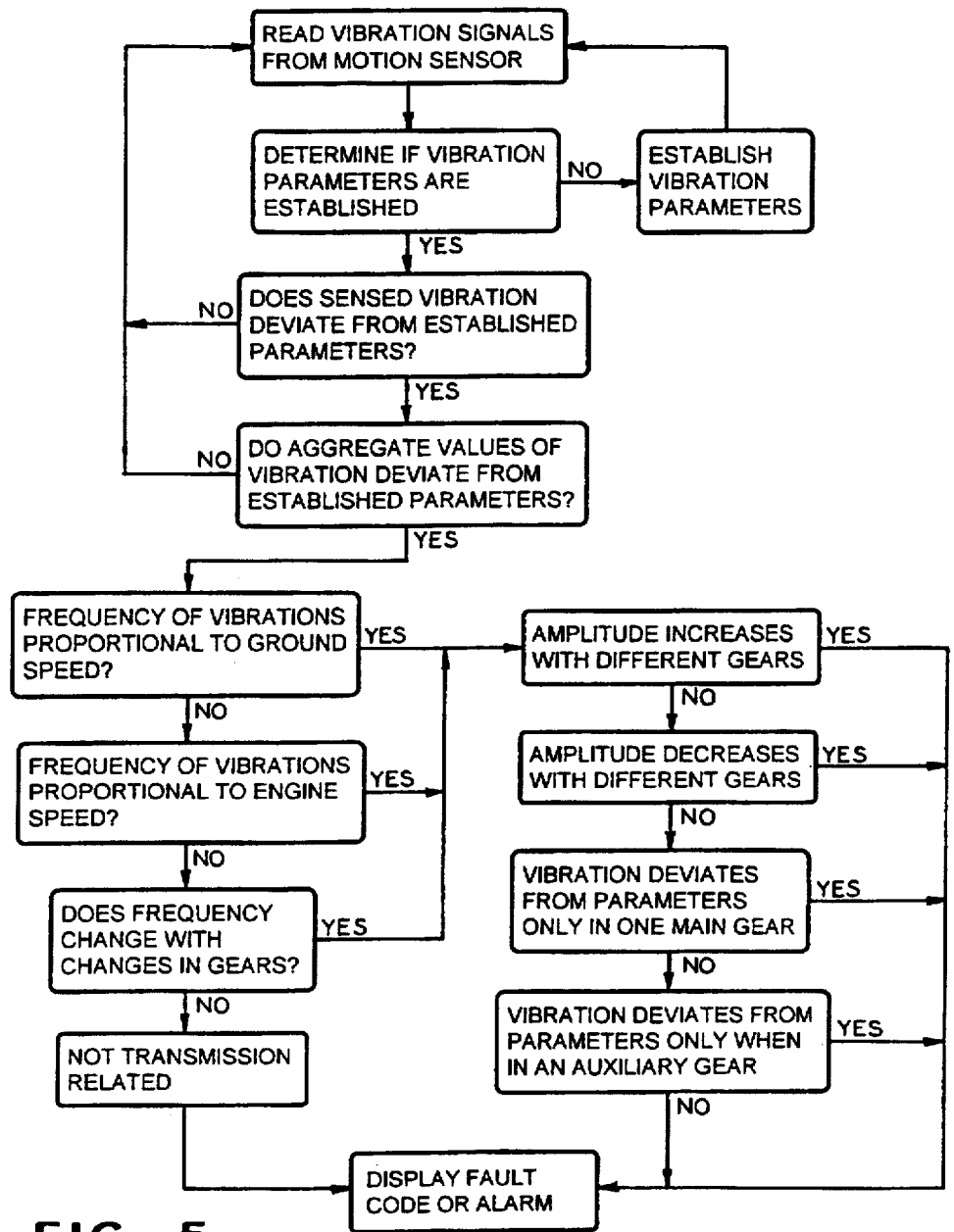
FIG. 5 is a schematic diagram illustrating a flow chart which could be used by the controller in the transmission monitoring system of the invention.

As shown in FIG. 5, the controller 91 can be programmed to accept vibration signals from the sensor 90 and make various comparisons to diagnose causes of vibration. Further, the controller 91 can be programmed to determine if vibration parameters are established, and if not, to establish program parameters. Alternatively, the vibration parameters can be preloaded into the controller 91. Data from any one of the steps shown in FIG. 5 can be stored in the controller 91 for use in other steps of the process. Also, it is to be understood that the logic of FIG. 5 is merely illustrative, and that other logic could be used with the transmission monitoring system of the invention.

In operation, the gearshift lever 26 is operated by the vehicle driver through various positions to move the shift rails 36, 37 and 38 forward or rearward. Moving the shift rails shifts clutch collars 50, 51 and 52 so that various rotating mainshaft gears 71–74, or input gear 56 are engaged with the mainshaft 70. Torque is provided to the mainshaft gears 71–74 through the countershafts 58 and 59, and the associated countershaft gears. The optional auxiliary transmission section provides a high range and a low range. Sensor 90 mounted on the shift tower assembly 28 senses the frequency and amplitude of vibration of the transmission assembly 11, and sends signals to the controller 91. The controller 91 compares the sensed level of vibration to a predetermined value, and assesses whether or not there is a need for an alarm. The controller 91 can be adapted to use various logical tests to pinpoint or localize the source of excessive vibration. Data from an on-board controller 95 can supplied to the controller 91 to facilitate pinpointing or localizing the source of vibration.

Although the use of the monitoring system has been described above in connection with a transmission assembly, it is to be understood that the invention can be used by monitoring the vibration of other drive train power distribution devices, such as for example, transaxles, differential housings, transfer cases, driveshaft center bearings, speed retarders, and power takeoffs.

Figure 6:
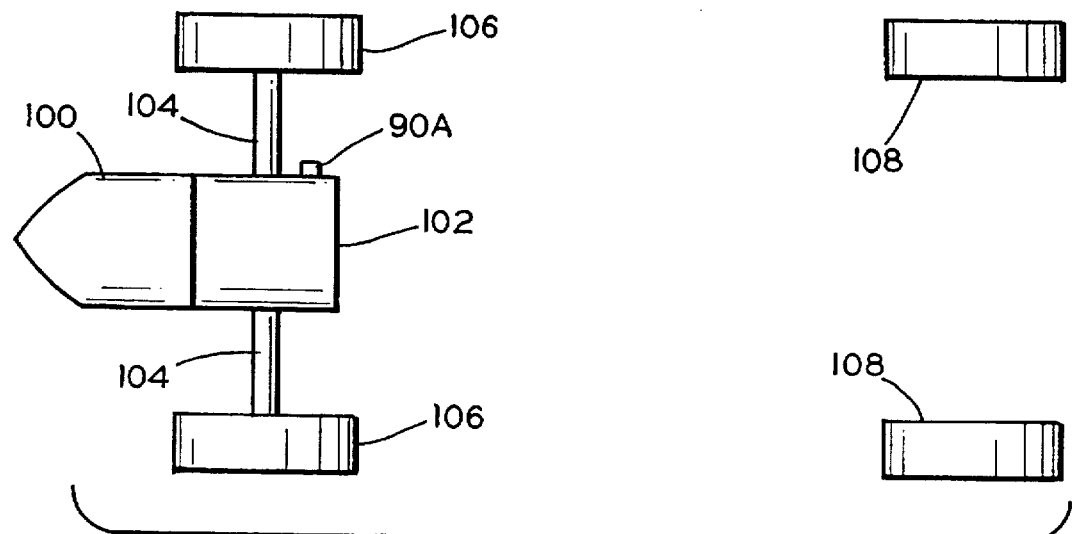
FIG. 6 is a schematic plan view of the drive train assembly of the invention, including a forward transaxle and the monitoring system of the invention.

FIG. 6 illustrates a drive train assembly arranged in accordance with the invention. As shown, the engine 100 is connected to the forward transaxle 102, and the power is transferred to the two half-shafts 104. The half-shafts drive the front wheels 106, and the rear wheels 108 are not driven. It is to be understood that in many drive train configurations the engine and forward transaxle are oriented 90 degrees to the orientation shown in FIG. 6. The vibration sensor 90A is positioned on the forward transaxle 102, and the sensor senses the frequency and amplitude of vibration of the transaxle. The sensor 90A sends signals to the controller 91 (FIG. 4). The controller 91 compares the sensed level of vibration to a predetermined value, and assesses whether or not there is a need for an alarm, in a manner similar to that described above.

Figure 7:
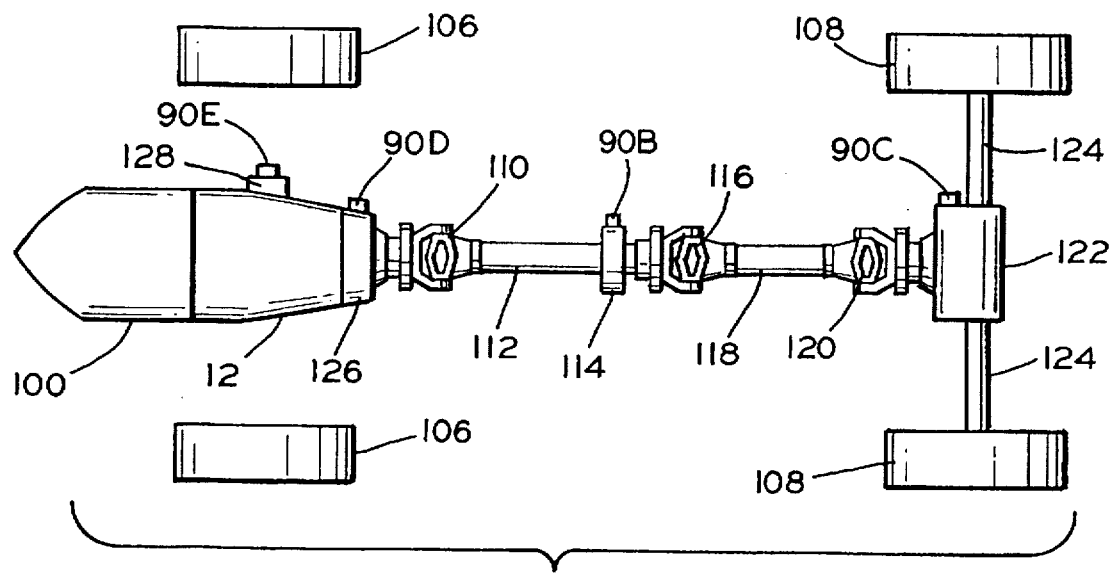
FIG. 7 is a schematic plan view of the drive train assembly of the invention, including a differential housing and the monitoring system of the invention.

As shown in FIG. 7, the transmission 12 is connected via a forward universal joint 110 to forward driveshaft 112. The forward driveshaft 112 is held up by a driveshaft center bearing assembly 114, which typically includes a housing having a bearing, a strap, and a rubber isolator, not shown. The driveshaft center bearing assembly 114 is provided with a sensor 90B, preferably mounted on the housing, for sensing the frequency and the amplitude of the vibration of the center bearing assembly 114. The sensor 90B provides a signal to the controller 91 for indicating the condition of the drive train assembly, in a manner similar to that described above.

Positioned rearward of the drive shaft center bearing assembly 114 is a center universal joint 116 which connects to the rear driveshaft 118. Rear universal joint 120 connects the forward driveshaft 112 to the rear driveshaft 118 to the rear differential housing 122. The rear differential housing 122 supplies torque to the rear wheels 108 via the axle 124. A sensor 90C is provided on the rear differential housing 122 to sense the frequency and amplitude of the vibration of the rear differential housing, and this signal is supplied to the controller 91 in a manner described above.

Optionally, the drive train assembly can be provided with a speed retarder 126 used for auxiliary braking of the vehicle when going down hills. The retarder 126 can be provided with a sensor 90D for sensing the frequency and the amplitude of the vibration of the retarder 126. The sensor 90D provides a signal to the controller 91 for indicating the condition of the drive train assembly, in a manner similar to that described above.

The transmission 12 can also be optionally provided with a power take off 128, as shown in FIG. 7. The power takeoff can be used to power various types of auxiliary equipment. A sensor 90E is provided on power takeoff 128 to sense the frequency and amplitude of the vibration of the power takeoff, and this signal is supplied to the controller 91 in a manner described above.

Figure 8:
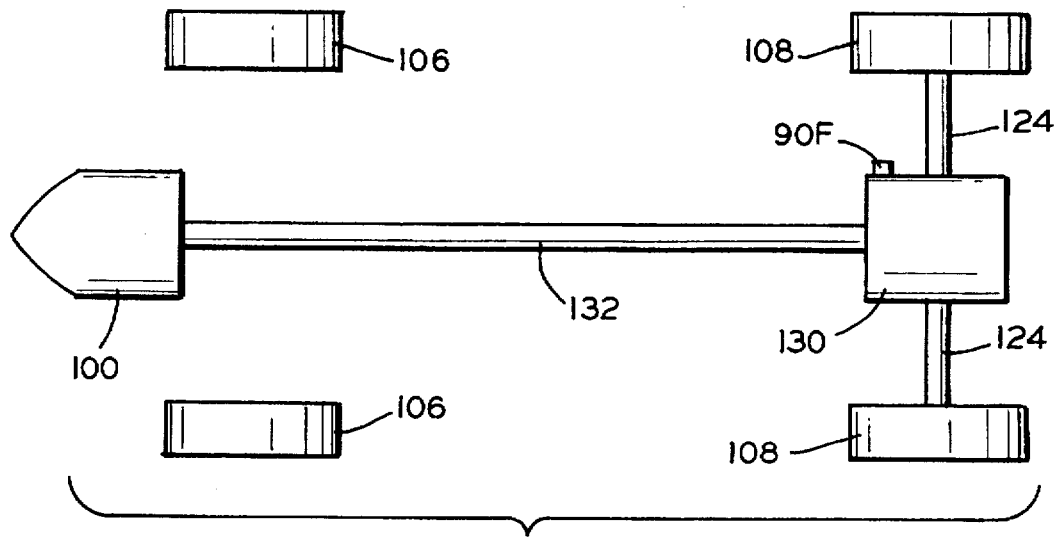
FIG. 8 is a schematic plan view of the drive train assembly of the invention, including a rear transaxle and the monitoring system of the invention.

As shown in FIG. 8, the drive train assembly can be configured with a rear transaxle 130 to convert the power from the driveshaft 132 to drive the rear wheels 108 via the rear axle 124. The rear transaxle 130 can be provided with a sensor 90F for sensing the frequency and the amplitude of the vibration of the rear transaxle 130. The sensor 90F provides a signal to the controller 91 for indicating the condition of the drive train assembly, in a manner similar to that described above.

Figure 9:
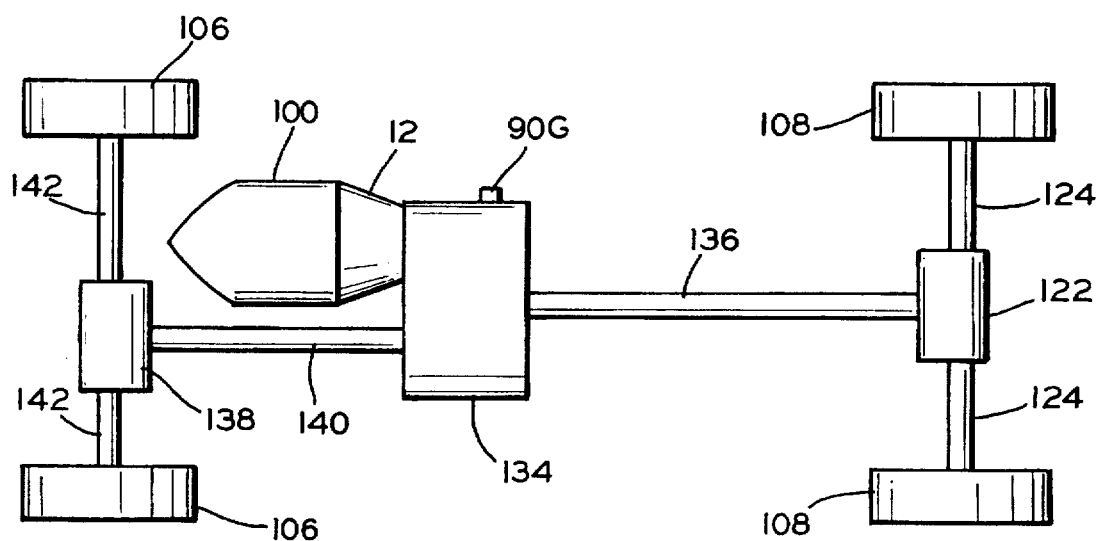
FIG. 9 is a schematic plan view of the drive train assembly of the invention, including a transfer case and the monitoring system of the invention.

The drive train assembly shown in FIG. 9 has a transfer case 134 which distributes power from the engine 100 and transmission 12. Power is transferred via rear driveshaft 136 to the rear differential 122, which supplies power to the rear wheels 108. Power is also transferred to the front differential 138 via front driveshaft 140. The front differential distributes torque to the front wheels 106 via axles 142. For automotive applications a half-shaft could be used. A sensor 90G is provided on transfer case 134 to sense the frequency and amplitude of the vibration of the transfer case 134, and this signal is supplied to the controller 91 in a manner described above.

It is to be understood that any number of drive train assembly components, including those not illustrated above, can be provided with one or more sensors to indicate the operating condition of the drive train assembly according to this invention.

It will be evident from the foregoing that various modifications can be made to this invention. Such, however are considered as being within the scope of the invention.

What is claimed is:

1. A combined drive train assembly and monitoring system comprising:

a drive train assembly including a power distribution device for distributing rotative power within the drive train;

a sensor responsive to vibration of said power distribution device for generating a signal which is representative thereof; and a controller responsive to said signal from said sensor for comparing said signal from said sensor with a predetermined signal characteristic and for generating an indication of an operating condition of said power distribution device when said signal from said sensor deviates from said predetermined signal characteristic by more than a predetermined amount.

2. The combined drive train assembly and monitoring system defined in claim 1 wherein said sensor generates a signal which is representative of a frequency of said vibration of said power distribution device.

3. The combined drive train assembly and monitoring system defined in claim 2 wherein said controller assesses whether said sensed frequency signal is proportional to a vehicle ground speed.

4. The combined drive train assembly and monitoring system defined in claim 1 wherein said sensor generates a signal which is representative of a magnitude of said vibration of said power distribution device.

5. The combined drive train assembly and monitoring system defined in claim 1 wherein said controller is operable in a startup mode, wherein said signal from said sensor is used to establish said predetermined characteristic signal, and in a comparative mode, wherein said signal from said sensor is compared with said predetermined characteristic signal.

6. The combined drive train assembly and monitoring system defined in claim 1 wherein said controller periodically compares said signal from said sensor with said predetermined signal characteristic.

7. The combined drive train assembly and monitoring system defined in claim 1 wherein said controller generates an output signal when an aggregate value of said sensor signals exceed a predetermined limit.

8. The combined drive train assembly and monitoring system defined in claim 1 wherein said power distribution device is a transaxle.

9. The combined drive train assembly and monitoring system defined in claim 1 wherein said power distribution device is a differential housing.

10. The combined drive train assembly and monitoring system defined in claim 1 wherein said power distribution device is a transfer case.

11. The combined drive train assembly and monitoring system defined in claim 1 wherein said power distribution device is a retarder.

12. The combined drive train assembly and monitoring system defined in claim 1 wherein said power distribution device is a drive shaft center bearing.

13. The combined drive train assembly and monitoring system defined in claim 1 wherein said power distribution device is a power take off.

14. A combined drive train assembly and monitoring system comprising:

a drive train assembly including a transaxle for distributing rotative power within the drive train;

a sensor responsive to vibration of said transaxle for generating a signal which is representative of a frequency of said vibration of said drive train assembly and which is representative of a magnitude of said vibration of said drive train assembly; and a controller responsive to said signal from said sensor for comparing said signal from said sensor with a predetermined signal characteristic and for generating an indication of an operating condition of said transaxle when said signal from said sensor deviates from said predetermined signal characteristic by more than a predetermined amount.

15. The combined drive train assembly and monitoring system defined in claim 14 wherein said transaxle is a front transaxle.

16. The combined drive train assembly and monitoring system defined in claim 14 wherein said controller is operable in a startup mode, wherein said signal from said sensor is used to establish said predetermined characteristic signal, and in a comparative mode, wherein said signal from said sensor is compared with said predetermined characteristic signal.

17. The combined drive train assembly and monitoring system defined in claim 14 wherein said controller generates an output signal when an aggregate value of said sensor signals exceed a predetermined limit.

18. A combined drive train assembly and monitoring system comprising:

a drive train assembly including a differential housing for distributing rotative power within the drive train;

a sensor responsive to vibration of said differential housing for generating a signal which is representative of a frequency of said vibration of said drive train assembly and which is representative of a magnitude of said vibration of said drive train assembly; and a controller responsive to said signal from said sensor for comparing said signal from said sensor with a predetermined signal characteristic and for generating an indication of an operating condition of said differential housing when said signal from said sensor deviates from said predetermined signal characteristic by more than a predetermined amount.

19. The combined drive train assembly and monitoring system defined in claim 18 wherein said controller is operable in a startup mode, wherein said signal from said sensor is used to establish said predetermined characteristic signal, and in a comparative mode, wherein said signal from said sensor is compared with said predetermined characteristic signal.

20. The combined drive train assembly and monitoring system defined in claim 18 wherein said controller generates an output signal when an aggregate value of said sensor signals exceed a predetermined limit.

* * * * *